United States Patent
Maeda et al.

(10) Patent No.: US 7,316,131 B2
(45) Date of Patent: Jan. 8, 2008

(54) AIR-COOLING AND TEMPERING APPARATUS AND AIR-COOLING AND TEMPERING METHOD FOR A GLASS SHEET

(75) Inventors: Kenji Maeda, Aichi (JP); Masanao Harada, Aichi (JP); Junji Hori, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 473 days.

(21) Appl. No.: 10/831,230

(22) Filed: Apr. 26, 2004

(65) Prior Publication Data

US 2004/0216489 A1    Nov. 4, 2004

(30) Foreign Application Priority Data

Apr. 30, 2003    (JP)    ............................. 2003-124920

(51) Int. Cl.
*C03B 27/04*    (2006.01)
(52) U.S. Cl. ............................. 65/114; 65/348; 65/104
(58) Field of Classification Search ................... 65/114
See application file for complete search history.

(56) References Cited

U.S. PATENT DOCUMENTS 3,125,430 A * 3/1964 Richardson .................. 65/114
4,619,683 A 10/1986 Halberschmidt et al.
4,976,762 A 12/1990 Anttonen
5,846,281 A * 12/1998 Nikander et al. ............. 65/114
2002/0189289 A1 12/2002 Shetterly et al.

FOREIGN PATENT DOCUMENTS

| EP | 1 300 370 A1 | 4/2003 |
|---|---|---|
| JP | 2000-281369 | 10/2000 |
| JP | 2002-193631 | 7/2002 |
| JP | 2003112934 | 4/2003 |
| WO | WO 02/074705 A1 | 9/2002 |

OTHER PUBLICATIONS

U.S. Appl. No. 10/260,428, filed Oct. 1, 2002, Maeda.
U.S. Appl. No. 10/831,230, filed Apr. 26, 2004, Maeda et al.

* cited by examiner

*Primary Examiner*—Eric Hug
*Assistant Examiner*—Michael J. Felton
(74) *Attorney, Agent, or Firm*—Oblon, Spivak, McClelland, Maier & Neustadt, P.C.

(57) ABSTRACT

An air-cooling and tempering apparatus for a glass sheet includes an upper air-blowing unit, which blows cooling air to an upper surface of a bent glass sheet having a high temperature; and a lower air-blowing unit, which blows cooling air to a lower surface of the glass sheet. Each of the upper air-blowing unit and the lower air-blowing unit includes a plurality of air-blowing members provided in a matrix pattern and a plurality of linkages, the linkages coupling adjacent air-blowing members among the plurality of air-blowing members in a row and/or column direction of the matrix pattern.

16 Claims, 8 Drawing Sheets

AIR-COOLING AND TEMPERING APPARATUS AND AIR-COOLING AND TEMPERING METHOD FOR A GLASS SHEET

The present invention relates to an air-cooling and tempering apparatus and an air-cooling and tempering method for a glass sheet, in particular an air-cooling and tempering apparatus and an air-cooling and tempering method for a glass sheet, wherein cooling air is blown to both surfaces of a curved glass sheet to air-cool and temper the glass sheet, the glass sheet having been bent and heated to a high temperature.

There has been known a production apparatus, which produces a curved glass sheet for an automobile window by heating a glass sheet to a temperature close to the softening point in a heating furnace, bending the heated glass sheet by a mold and quenching the bent glass sheet by an air-cooling and tempering apparatus.

The air-cooling and tempering apparatus comprises an upper air-blowing unit and a lower air-blowing unit. When a curved glass sheet is introduced in between the upper and lower air-blowing units, the upper air-blowing unit blows cooling air to an upper surface of the curved glass sheet, while the lower air-blowing unit blows cooling air to a lower surface of the curved glass sheet. Thus, the glass sheet having a high temperature is quenched to have a compressive stress layer formed in both surface portions, thereby being tempered. The air-blowing surfaces defined by plural air-blowing members of both air-blowing units are set so as to have an equal distance to the curved glass sheet in the entire surfaces of the glass sheet in order to uniformly cool the entire glass sheet.

One of the inventors has proposed an air-cooling and tempering apparatus for a glass sheet, wherein in order to cope with limited production of diversified curved glass sheets, an upper air-blowing unit and a lower air-blowing unit are respectively divided into a plurality of air-blowing members, a divided air-blowing member and the divided air-blowing member adjacent thereto are coupled together through a linkage comprising a plurality of links so that the air-blowing surfaces defined by the plural air-blowing members can be modified so as to have a radius of curvature according to the curved surfaces of a glass sheet (see, e.g., JP-A-2000-281369, pages 4 to 5 and FIG. 2).

However, the air-cooling and tempering apparatus disclosed in the reference stated earlier has a problem that although it is possible to deal with a single curved glass sheet curved with a single radius of curvature, it is impossible to deal with a complex curved glass sheet curved with a plurality of radiuses of curvature since the plural air-blowing members have a single curvature direction.

The present invention is proposed in consideration of the circumstances. It is an object to provide an air-cooling and tempering apparatus and an air-cooling and tempering method for a glass sheet, which are capable to dealing with a complex curved glass sheet.

In order to attain the object, the present invention provides an air-cooling and tempering apparatus for a glass sheet, comprising an upper air-blowing unit, which blows cooling air to an upper surface of a bent glass sheet having a high temperature; and a lower air-blowing unit, which blows cooling air to a lower surface of the glass sheet. Each of the upper air-blowing unit and the lower air-blowing unit includes a plurality of air-blowing members provided in a matrix pattern and a plurality of linkages, the linkages coupling adjacent air-blowing members among the plurality of air-blowing members in a row and/or column direction of the matrix pattern.

It is preferable that each of the linkages comprise a four-bar linkage.

It is preferable that the linkages are composed by coupling a plurality of units, each of the units comprising an elongated common link, a first link coupled to one end of the common link by a first pin and having both ends formed with toothed portions, a second link coupled to the other end of the common link by a second pin and having both ends formed with toothed portions, a third coupled to the one end of the common link by a third pin and having both ends formed with toothed portions, and a fourth link coupled to the other end of the common link by a fourth pin and having both ends formed with toothed portions.

It is preferable that air-blowing members provided in the row direction on an outermost side of the matrix pattern are coupled by the four-bar linkages, and adjacent air-blowing members in the column direction of the matrix pattern among the air-blowing members are all coupled by the four-bar linkages.

It is preferable that adjacent air-blowing members provided in the column direction have coupling portions sealed by a flexible boot so that cooling air communicates between the adjacent air-blowing members provided in the column direction.

It is preferable that the air-blowing members of the upper air-blowing unit and the air-blowing members of the lower air-blowing unit are formed with nozzles having a aperture for injecting cooling air, respectively, and the nozzles formed on the air-blowing members of the upper air-blowing unit and the nozzles formed on the air-blowing members of the lower air-blowing unit are provided so as to confront each other.

It is preferable that each of the nozzles has the aperture for injecting cooling air and a groove for letting the cooling air escape.

It is preferable that the glass sheet is used for production of an automobile window.

The present invention also provides an air-cooling and tempering method for a glass sheet, wherein there are provided an upper air-blowing unit, which blows cooling air to an upper surface of a bent glass sheet having a high temperature; and a lower air-blowing unit, which blows cooling air to a lower surface of the glass sheet. The method comprises forming each of the upper air-blowing unit and the lower air-blowing unit out of a plurality of air-blowing members provided in a matrix pattern and a plurality of linkages, the linkages coupling adjacent air-blowing members among the air-blowing members in a row and/or column direction of the matrix pattern; modifying locations of the air-blowing members forming the upper air-blowing unit and/or the lower air-blowing unit according to a shape of a glass sheet to be cooled; conveying the glass sheet subjected to heating in between the upper air-blowing unit and the lower air-blowing unit; and blowing the cooling air from the air-blowing members to the glass sheet to cool and temper the glass sheet.

It is preferable that each of the linkages comprises a four-bar linkage.

In accordance with the present invention, air-blowing members provided in a matrix pattern can be displaced in terms of positions in a row and/or column direction by linkages (in particular form-bar linkages). By this arrangement, the positions of air-blowing members of the upper air-blowing unit and/or the lower air-blowing unit can be modified according to the shape of a glass sheet to be cooled, making the air-blowing surface defined by all air-blowing members out of a curved surface with a first radius of curvature formed in the row direction of the matrix and a second radius of curvature formed in the column direction of the matrix combined. When the four-bar linkages have different actuation angles, it is possible to form an air-blowing surface having a plurality of radiuses of curvature. In accordance with the present invention, it is possible to deal with a curved glass sheet bent with a plurality of radiuses of curvature.

Now, a preferred embodiment of the present invention will be described in detail, referring to the accompanying drawings.

Figure 1:
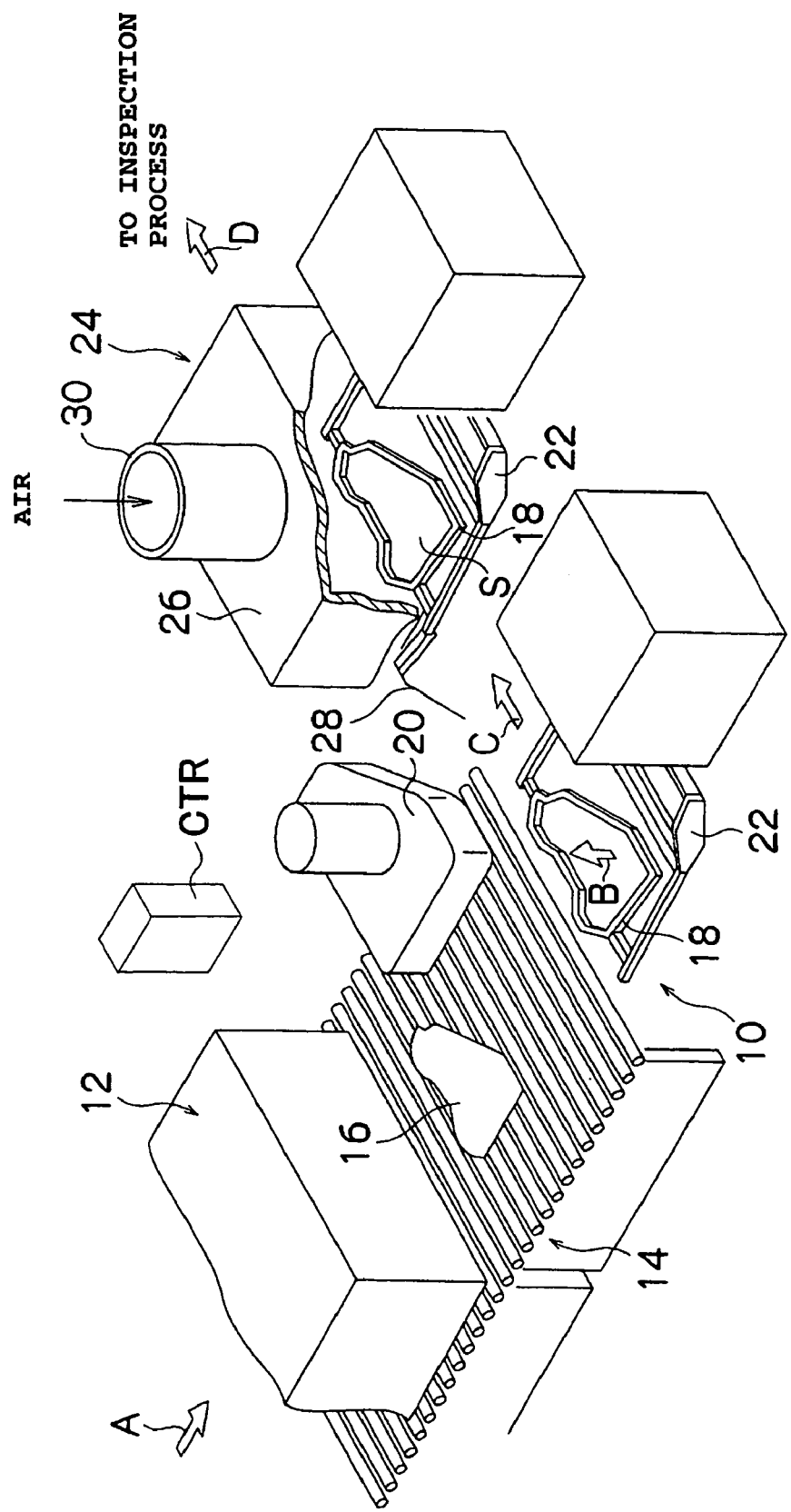
FIG. 1 is a structural view of a glass sheet bending system, to which the air-cooling and tempering apparatus according to an embodiment of the present invention is applied.

FIG. 1 is a perspective view showing the structure of a glass sheet bending system 10 including the air-cooling and tempering apparatus for a glass sheet according to the embodiment. The glass sheet bending system 10 shown in FIG. 1 is a production apparatus for an automobile side window. A motion controller CTR controls the operations of respective parts of the glass sheet bending system 10, such as modification of the curvature of surfaces defined by a plurality of air-blowing members stated later, conveyance of a glass sheet by rollers, driving of a press ring, and on-and-off control of air injected from the air-blowing members.

The glass sheet bending system 10 has a heating furnace 12 provided on an upstream side in the conveying direction of a glass sheet. The heating furnace 12 includes a roller conveyor 14. A glass sheet to be bent 16 is conveyed in the direction of an arrow A in FIG. 1 in the heating furnace 12 by the roller conveyor 14 and is heated to reach a temperature close to the softening point (about 650° C. to about 700° C.) at the outlet of the heating furnace.

The heated glass sheet 16 is conveyed to the glass sheet bending system 10 by the roller conveyor 14. In the glass sheet bending system, the glass sheet 16 has the peripheral edge of a lower surface supported by a press ring 18, which is formed in a frame shape along the outline shape of the glass sheet 16. The glass sheet 16 supported by the press ring 18 is moved toward a top mold 20 by upward movement of the press ring 18 shown in the direction of an arrow B. The top mold 20 is a male mold, which has a lower end formed with a convex portion (not shown). The glass sheet 16, which has been moved upward by the press ring 18, is pressed against the convex portion of the top mold 20 to be bent in a shape having complex curved surfaces conforming to the convex portion. Although the glass sheet 16 is bent by moving the press ring 18 upward with the top mold 20 fixed in this embodiment, the glass sheet 16 may be bent by moving the top mold 20 downward with the press ring 18 fixed, which is opposite movement to this embodiment.

The glass sheet 16 thus bent is moved in the direction of an arrow C in FIG. 1 by a transferring unit 22 for moving the press ring 18 horizontally, being supported by the press ring 18, and is conveyed into an air-cooling and tempering apparatus 24.

Figure 2:
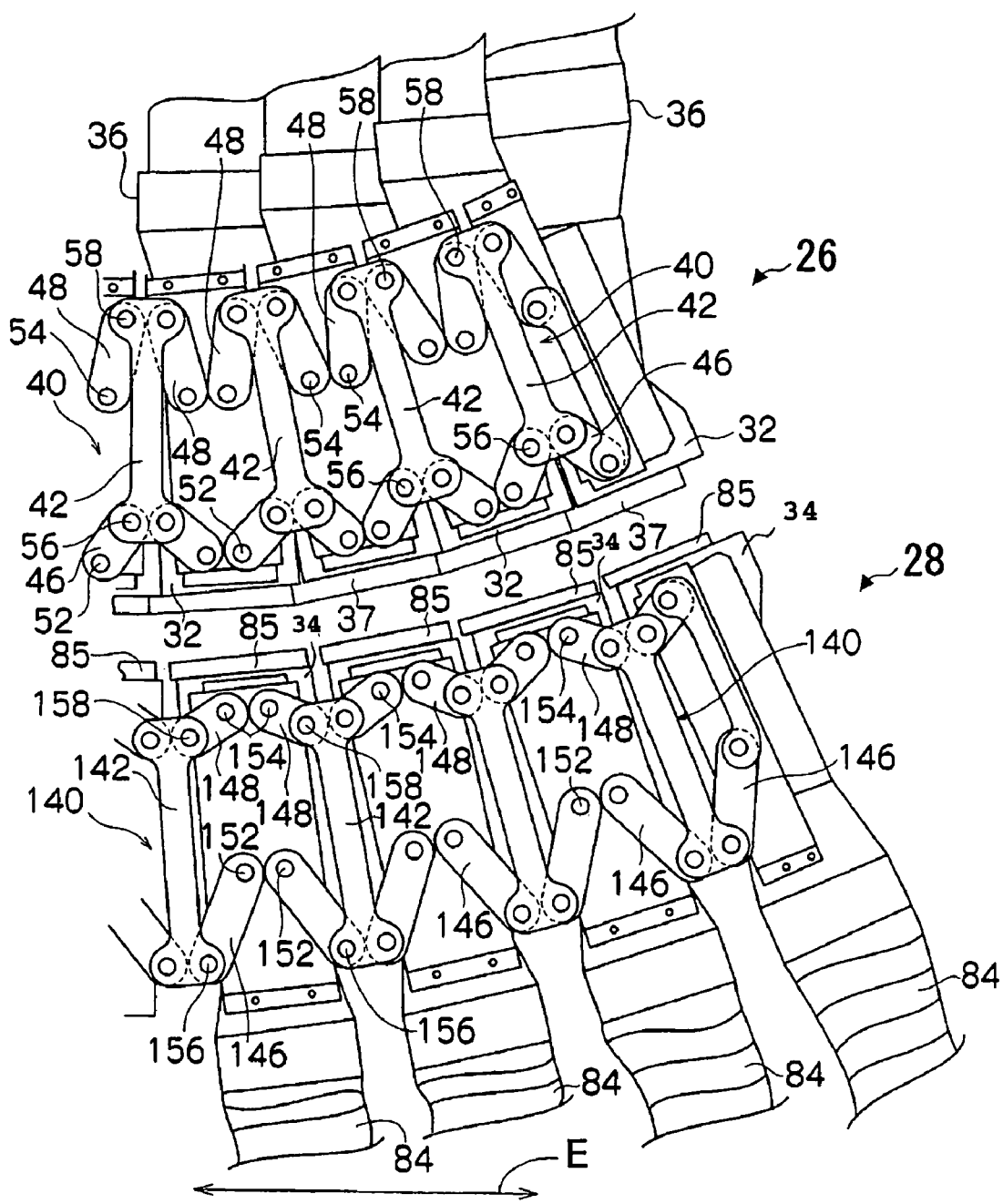
FIG. 2 is a structural view of first linkages of the air-cooling and tempering apparatus according to the embodiment.

The air-cooling and tempering apparatus 24 has an upper air supply unit 26 provided in an upper position and a lower air supply unit 28 provided in a lower position, which sandwich a glass treatment stage S therebetween. The upper air supply unit 26 and the lower air supply unit 28 are connected to respective ducts 30 (the duct connected to the lower air supply unit 28 being not shown), and the respective ducts are connected to an unshown blower. When the blower is driven, cooling air generated by the blower is supplied to the upper air supply unit 26 and the lower air supply unit 28 through the respective ducts 30. The cooling air is blown toward the glass treatment stage S shown in FIG. 1 through plural upper air-blowing members 32 forming the upper air supply unit 26 as shown in FIG. 2 and plural lower air-blowing members 34 forming the lower air supply unit 28. Thus, the glass sheet 16 supported by the press ring 18 is air-cooled and tempered by having both surfaces cooled.

The glass sheet 16 thus air-cooled and tempered is transferred from the press ring 18 onto an unshown quench ring and is conveyed to an inspection process by movement of the quench ring in the direction of an arrow D in FIG. 1. In the inspection process, the glass sheet 16 is inspected for defects, such as a crack. When the glass sheet is not defective, the glass sheet is conveyed to a process for non-defective products. When it is revealed that the glass sheet is defective, the glass sheet is conveyed to a recycling process.

Figure 3:
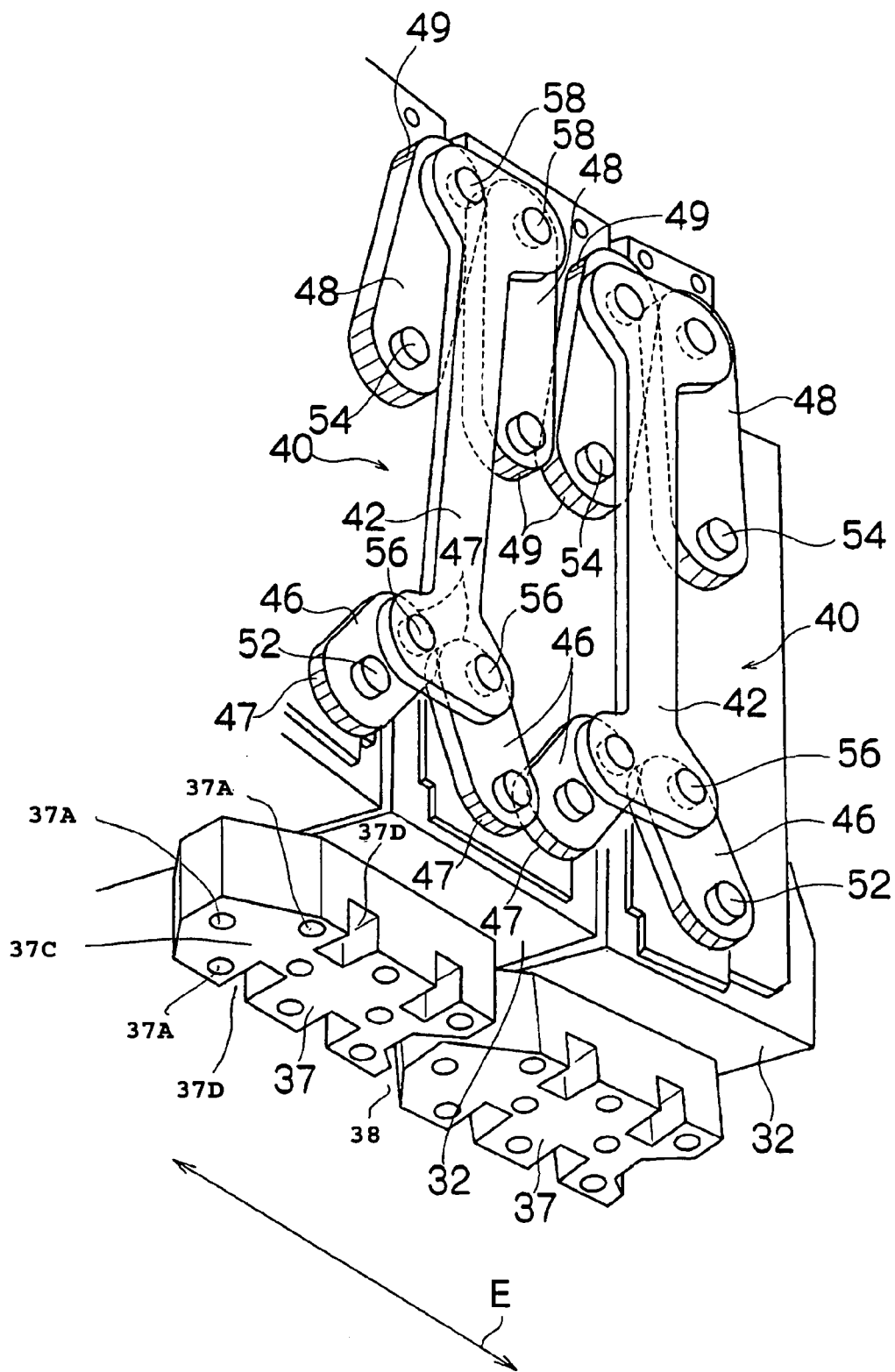
FIG. 3 is an enlarged structural view of the essential parts of first linkages of the air-cooling and tempering apparatus according to the embodiment.

The air-cooling and tempering apparatus 24 includes the plural upper air-blowing members 32 shown in FIGS. 2 and 3 and the plural lower air-blowing members 34 shown in FIG. 2.

Figure 4:
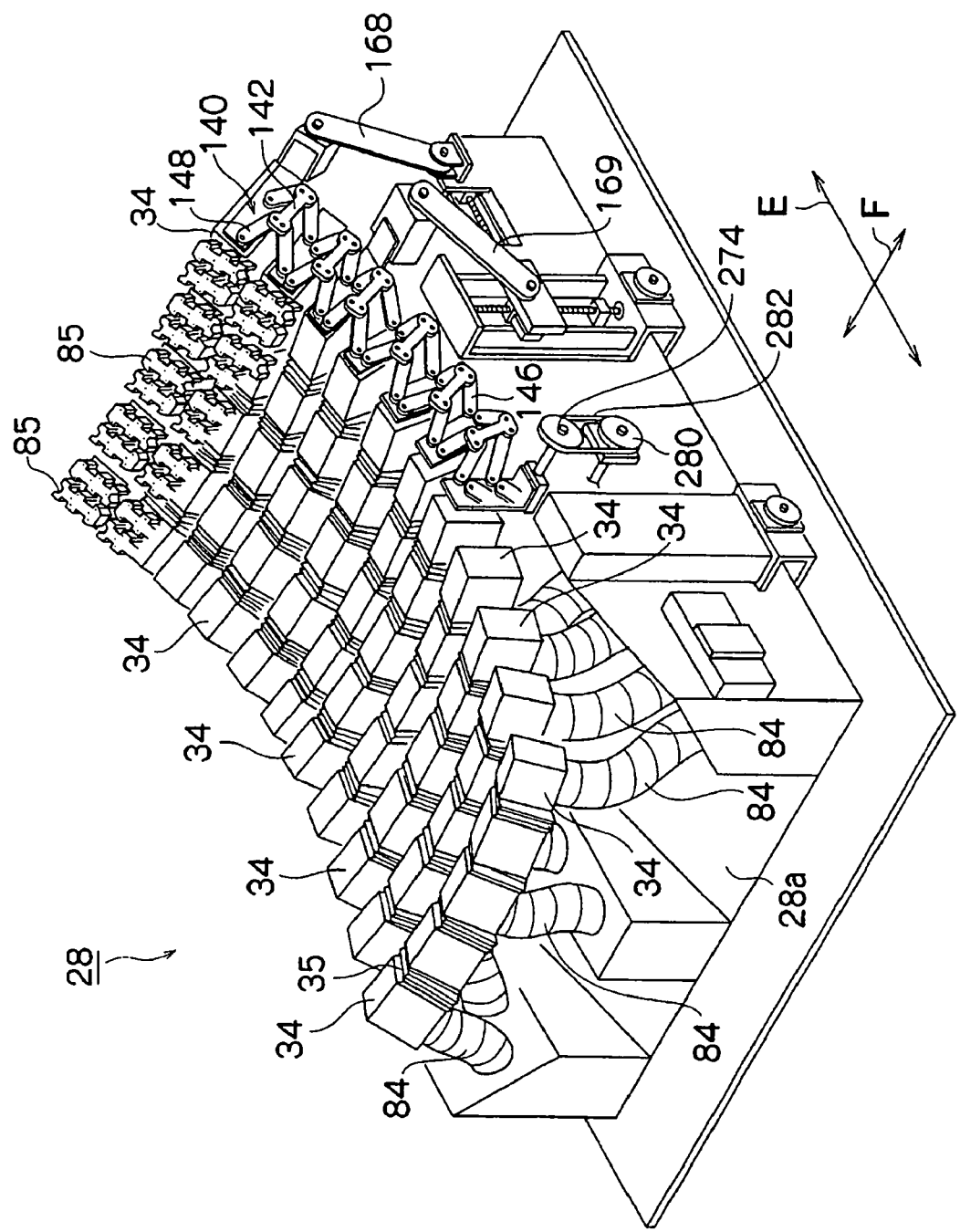
FIG. 4 is a perspective view showing the arrangement of lower air-blowing members of the air-cooling and tempering apparatus according to the embodiment.

FIG. 4 is a perspective view showing the arrangement of the lower air-blowing members 34, wherein the lower air-blowing members 34 are provided in a matrix pattern as a whole so that eleven lower air-blowing members 34 are provided side by side in every row along the direction of an arrow E (a direction perpendicular to the direction of introducing the glass sheet 16: the row direction of the matrix) and that five lower air-blowing members 34 are provided side by side in every column along the direction of an arrow F (the direction of introducing the glass sheet 16: the column direction of the matrix).

The eleven lower air-blowing members 34 that are provided in the direction of the arrow E are activated by first four-bar linkages stated later and can be displaced in such a curved fashion so as to have a desired radius of curvature along the direction of the arrow E. The five lower air-blowing members 34 that are provided in the direction of the arrow F are activated by second four-bar linkages stated later and can be displaced in such a curved fashion so as to have a desired radius of curvature along the direction of the arrow F. The five lower air-blowing members 34 that are provided side by side in the direction of the arrow F are connected together through flexible ducts (flexible boots) 35 in a tubular and bellows-shaped form and are moved so as to take the same posture as one another in conjunction with the activation of the first four-bar linkages. The first four-bar linkages may be provided only to the lower air-blowing members 34 in the first row on the front side as shown in FIG. 4 or may be provided to each of the lower air-blowing members 34 in the first row on the front side and the lower air-blowing members 34 in the fifth row.

Although only the lower air-blowing members 34 are shown in FIG. 4, the upper air-blowing members 32 shown in FIG. 2 and FIG. 3 have basically the same structure as the lower air-blowing members 34. In other words, the upper air-blowing members 32 are also provided in a matrix pattern as a whole so that plural upper air-blowing members are provided side by side along the direction of the arrow E and that plural upper air-blowing members are also provided side by side along the direction of the arrow F. The upper air-blowing members 32 that are provided in the direction of the arrow E are activated by first four-bar linkages and can be displaced in such a curved fashion so as to have a desired radius of curvature along the direction of the arrow E. The upper air-blowing members 32 that are provided in the direction of the arrow F are activated by second four-bar linkages stated later and can be displaced in such a curved fashion so as to have a desired radius of curvature along the direction of the arrow F.

As shown in FIG. 2 and FIG. 3, each of the upper air-blowing members 32 is a rectangular casing and has an upper end connected to a flexible tube 36, which is coupled to the duct 30 shown in FIG. 1 through a plenum (not shown). The cooling air supplied to the duct 30 is introduced into each of the upper air-blowing members 32 through the flexible tube 3. The respective upper air-blowing members 32 have projecting blocks 37 mounted to the respective lower ends at certain intervals in a longitudinal direction of the upper air-blowing members 32. The cooling air is injected downward from respective air injection nozzles 37A formed in the projecting blocks 37.

Each of the projecting blocks 37 has an outer surface formed in a convexo-concave shape as shown in FIG. 3. The convex portion 37C has air injection nozzles 37A formed in a staggered fashion, and the concave portions 37D work as grooves for letting stagnant air escape. By this arrangement, stagnant air can be effectively eliminated from the grooves between gaps 38, one of which is shown in FIG. 3.

Upper air-blowing members 32, which are provided side by side in the direction of the arrow E shown in FIG. 2 and FIG. 3, are movably coupled together by respective first linkages 40 as first four-bar linkages.

Each of the first linkages 40 comprises a common link 42 formed in a substantially I-shape, lower links 46 and upper links 48 obliquely provided to couple the common link 42 to the adjacent upper air-blowing members 32, and pins 52, 54, 56, 58 as pivotal members for coupling the respective links 42, 46, 48. In other words, each of the first linkages 40 is composed of the common link 42, the links 46 pivotally coupled to lower portions of the common link 42 through the pins 56 and pivotally coupled to lower portions of the adjacent upper air-blowing members 32 through the pins 52, and the links 48 pivotally coupled to upper portions of the common link 42 through the pins 58 and pivotally coupled to upper portions of the adjacent upper air-blowing members 32 through the pins 54.

As shown in FIG. 3, each of the links 46 has both circular arc edges formed with toothed portions 47. The paired links 46 that are coupled to a common link 42 are geared together at the upper edges thereof and on a common plane. Each of the paired links 46 and the link 46 coupled to the common link 42 adjacent thereto are geared together at the lower edges thereof and on the common plane. By this arrangement, when one of the geared links 46 is rotated by an angle θ, the other link 46 is accordingly rotated by the angle θ.

Likewise, each of the links 48 also has both circular arc edges formed with toothed portions 49. The paired links 48 that are coupled to a common link 42 are geared together at the upper edges thereof and on the common plane. Each of the paired links 48 and the link 48 coupled to the common link 42 adjacent thereto are geared together at the lower edges thereof and on the common plane. By this arrangement, when one of the geared links 48 is rotated by an angle θ, the other link 48 is accordingly rotated by the angle θ.

Figure 5:
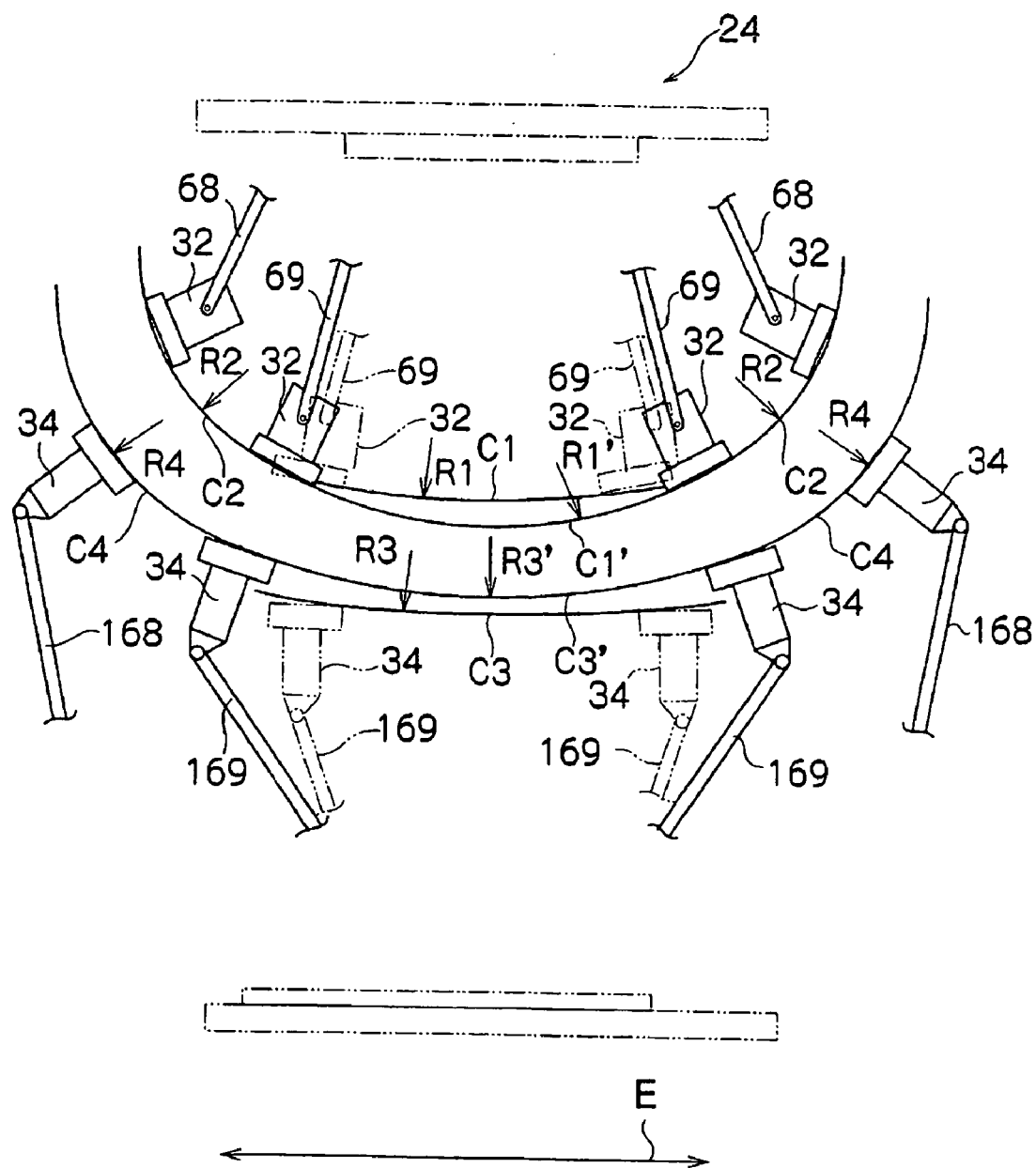
FIG. 5 is a schematic structural view of the drive unit for driving the linkages of the air-cooling and tempering apparatus according to the embodiment.

The upper air-blowing members 32, which are coupled by the first linkages 40, are configured so that the upper air-blowing members 32 provided at both edge locations are supported by an unshown swing unit through arms 68 as shown in FIG. 5. The upper air-blowing members 32 that are on at an inner side with respect to the upper air-blowing members 32 provided at both edge locations are also supported by an unshown swing unit through arms 69.

The arms 68, 69 are vertically and horizontally moved by a certain amount under the action of the swing units. When the arms 68, 69 are moved in this way, the upper air-blowing members 32 are swung about an unshown pivotal point under the cooperative action of the first linkages 40.

Specifically speaking, when the arms 69 are swung so as to be closer one another, the links 46 and the links 48 of the first linkage 40 between adjacent arms 69 have the angle to a horizontal line increased, and the curved line C1 that connects the air injection nozzles of the respective projecting blocks 37 has a radius of curvature R1 increased since the angular change is transmitted between adjacent first linkages 40 one after another. When arms 69 are swung so as to be apart from one another, the links 46 and the links 48 of the first linkage 40 between adjacent arms 69 have the angle to the horizontal line decreased, and the curved line C1' that connects the air injection nozzles of the respective projecting blocks 37 has a radius of curvature R1' decreased since the angular change is transmitted between adjacent first linkages 40 one after another. Since the radius of curvature R1 can be set at a desired radius of curvature by controlling the swinging amount of the arms 69, the radius of curvature R1 can be modified according to the curved shape of the glass sheet 16.

Additionally, when the arms 68 are swung, the curved line C2 that connects the air injection nozzles of the projecting blocks 37 between an arm 68 and the arm 69 adjacent thereto has a radius of curvature R2 increased or decreased since the links 46 and the links 48 of the first linkage 40 between the adjacent arms 68 and 69 have the angle to a horizontal line increased or decreased. Since the radius of curvature R2 can be set at a desired radius of curvature by controlling the swinging amount of the arms 68, the radius of curvature R2 can be modified according to the curved shape of the glass sheet 16. Thus, the upper air-blowing members 32, which are provided side by side in the direction of the arrow E, can be displaced in such a curved fashion so as to determine R1 and R2 at desired radiuses of curvature.

As shown in FIG. 2, each of the lower air-blowing members 34 is a rectangular casing and has a lower end connected to a flexible tube 84, which is coupled to a plenum 28a. The cooling air supplied to the duct coupled to the plenum 28a is introduced into each of the lower air-blowing members 32 through the flexible tube 84. The respective lower air-blowing members 34 have projecting blocks 85

(see FIG. 4) mounted to the respective upper ends at certain intervals in a longitudinal direction of the upper air-blowing members 34. The cooling air is injected upward from respective air injecting nozzles formed in the projecting blocks.

Each of lower air-blowing members 34, which are provided in the direction of the arrow E, has first linkages 140 as four-bar linkages provided thereto on both sides. Adjacent lower air-blowing members 34 in the direction of the arrow E are movably coupled together by the first linkage 140 provided therebetween.

The first linkages 140 and the first linkages 40 have substantially the same structure and function as one another and are provided so as to be vertically symmetrical with one anther with respect to the glass sheet 16. In other words, the first linkages 140 are provided as if the first linkages 40 are upside down.

Each of the first linkages 140 comprises a common link 142 formed in a substantially I-shape, lower links 146 and upper links 148 obliquely provided to couple the common link 142 to the adjacent lower air-blowing members 34, and pins 152, 154, 156, 158 as pivotal members for coupling the respective links 142, 146, 148. In other words, each of the first linkages 140 is composed of the common link 142, the links 146 pivotally coupled to lower portions of the common link 142 through the pins 156 and pivotally coupled to lower portions of the adjacent lower air-blowing members 34 through the pins 152, and the links 148 pivotally coupled to upper portions of the common link 142 through the pins 158 and pivotally coupled to upper portions of the adjacent lower air-blowing members 34 through the pins 154.

Each of the links 146, 148 has both circular arc edges formed with toothed portions as in the links 46, 48 shown in FIG. 3. Adjacent links 146, 148 are geared together as in the links 46, 48.

The lower air-blowing members 34, which are coupled by the first linkages 140, are configured so that the lower air-blowing members 34 provided at both edge locations are supported by an unshown swing unit through arms 168 as shown in FIG. 5. The lower air-blowing members 34 that are provided on an inner side with respect to the lower air-blowing members 34 provided at both edge locations are also supported by an unshown swing unit through arms 169.

The arms 168, 169 are vertically and horizontally moved by a certain amount under the action of the swing units. When the arms 168, 169 are moved in this way, the lower air-blowing members 34 are swung about an unshown pivotal point under the cooperative action of the first linkages 140.

Specifically speaking, when the arms 169 are swung so as to be closer one another, the links 146 and the links 148 of the first linkage 140 between adjacent arms 169 have the angle to a horizontal line increased, and the curved line C3 that connects the air injection nozzles of the respective projecting blocks 85 has a radius of curvature R3 increased since the angular change is transmitted between adjacent first linkages 140 one after another. When arms 169 are swung so as to be apart from one another, the links 146 and the links 148 of the first linkage 40 between adjacent arms 169 have the angle to the horizontal line decreased, and the curved line C3' that connects the air injection nozzles of the respective projecting blocks 85 has a radius of curvature R3' decreased since the angular change is transmitted between adjacent first linkages 140 one after another. Since the radius of curvature R3 can be set at a desired radius of curvature by controlling the swinging amount of the arms 169, the radius of curvature R3 can be modified according to the curved shape of the glass sheet 16.

Additionally, when the arms 168 are swung, the curved line C4 that connects the air injection nozzles 85A formed in the projecting blocks 85 between an arm 168 and the arm 169 adjacent thereto has a radius of curvature R4 increased or decreased since the links 146 and the links 148 of the first linkage 140 between adjacent arms 168 and 169 have the angle to a horizontal line increased or decreased. Since the radius of curvature R4 can be set at a desired radius of curvature by controlling the swinging amount of the arms 168, the radius of curvature R4 can be modified according to the curved shape of the glass sheet 16. Thus, the lower air-blowing members 34, which are provided side by side in the direction of the arrow E, can be displaced in such a curved fashion so as to determine R3 and R4 at desired radiuses of curvature.

As explained as stated earlier, the upper air-blowing members 32 and the lower air-blowing members 34 are displaced in such a curved fashion so as to have desired radiuses of curvature under the actions of the first linkages 40, 140.

Now, coupling structures for the air-blowing members that are provided in the direction of the arrow F in FIG. 4 will be explained. Since the coupling structure for the upper air-blowing members 32 and the coupling structure for the lower air-blowing members 34 have the same structure, only explanation of the coupling structure for the lower air-blowing members 34 will be made, and explanation of the coupling structure for the lower air-blowing members 32 will be omitted.

Figure 6:
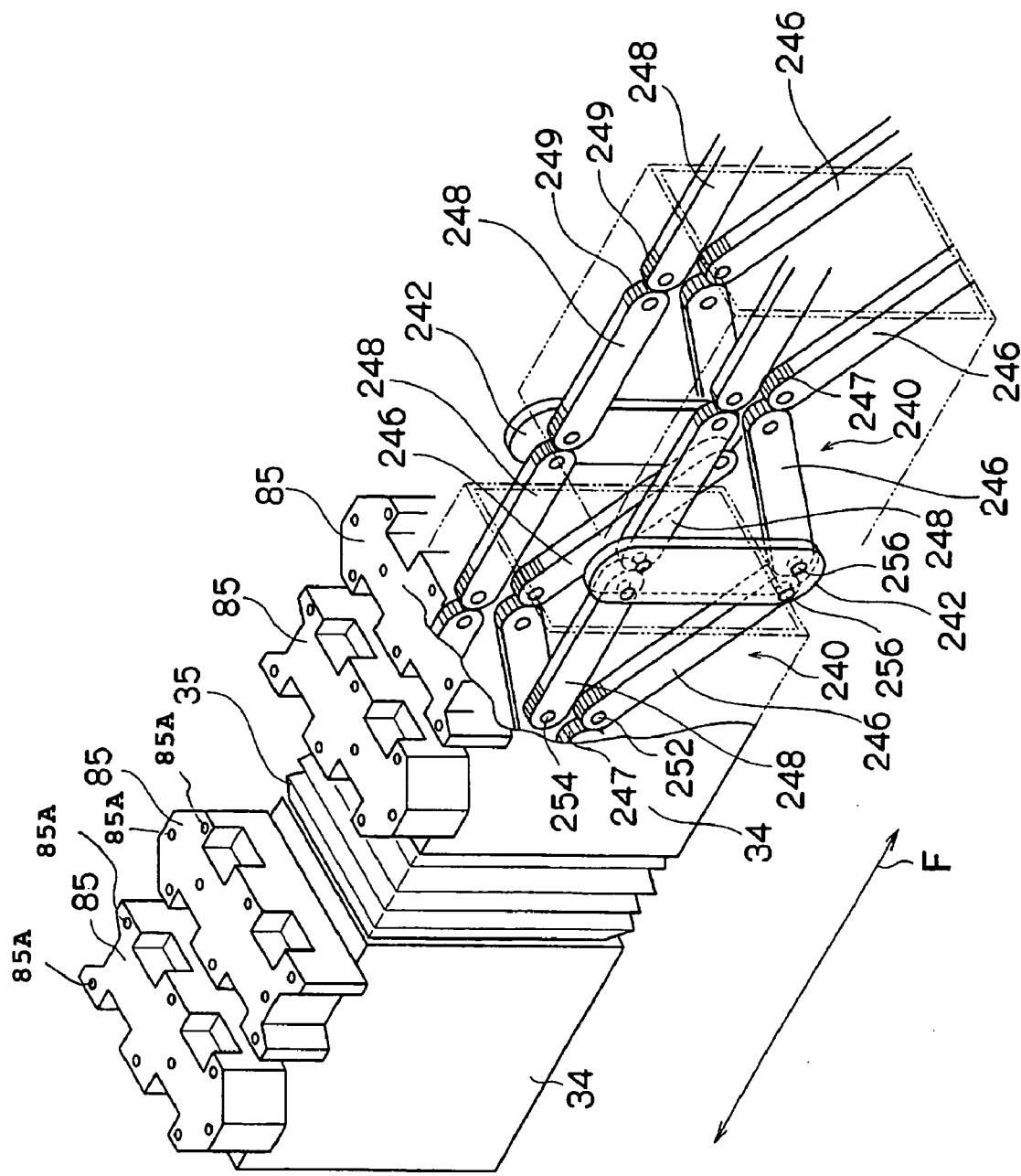
FIG. 6 is an enlarged perspective view of the essential parts of second linkages of the air-cooling and tempering apparatus according to the embodiment.
Figure 7:
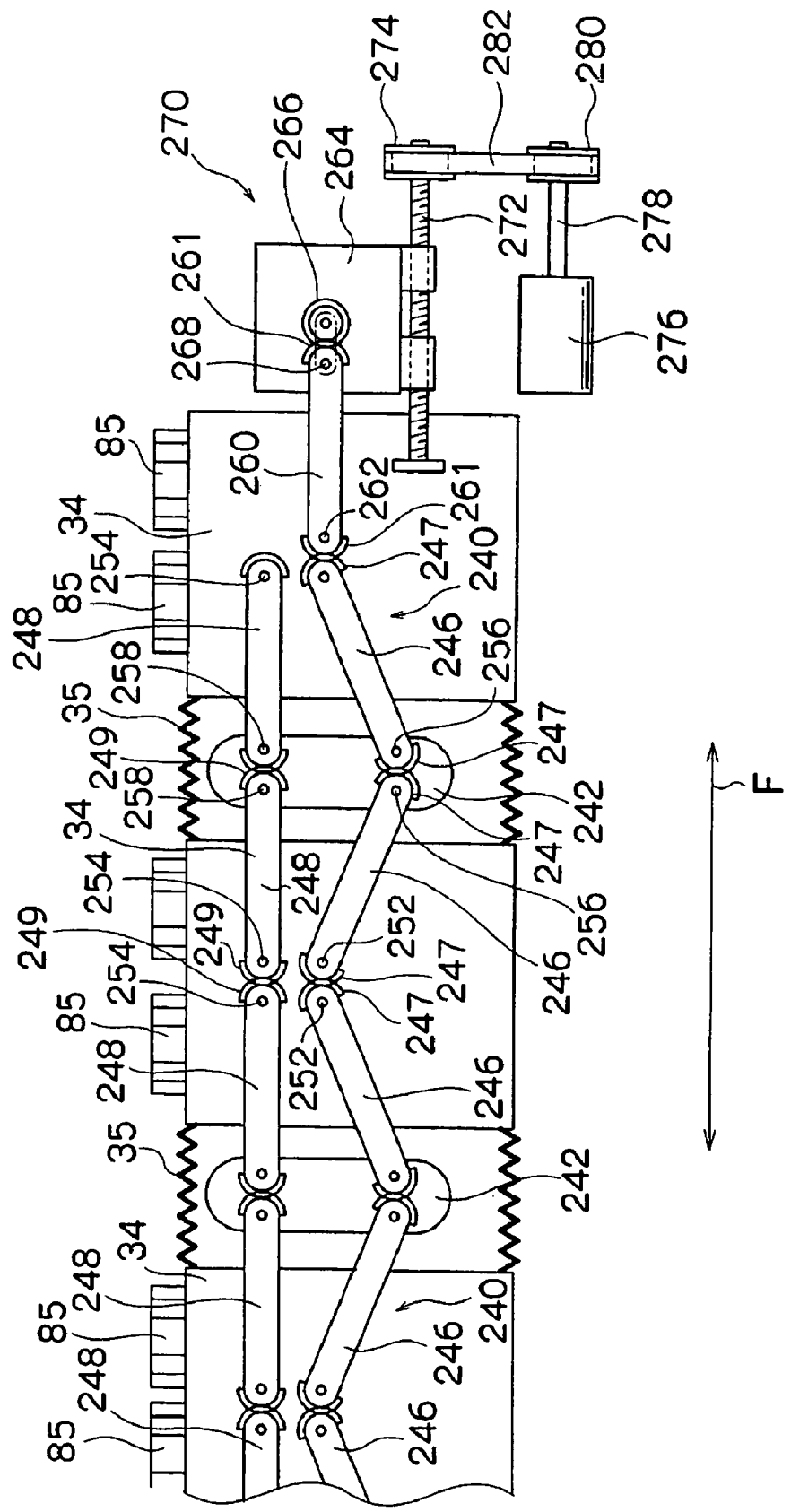
FIG. 7 is an enlarged structural view of the essential parts of second linkages of the air-cooling and tempering apparatus.
Figure 8:
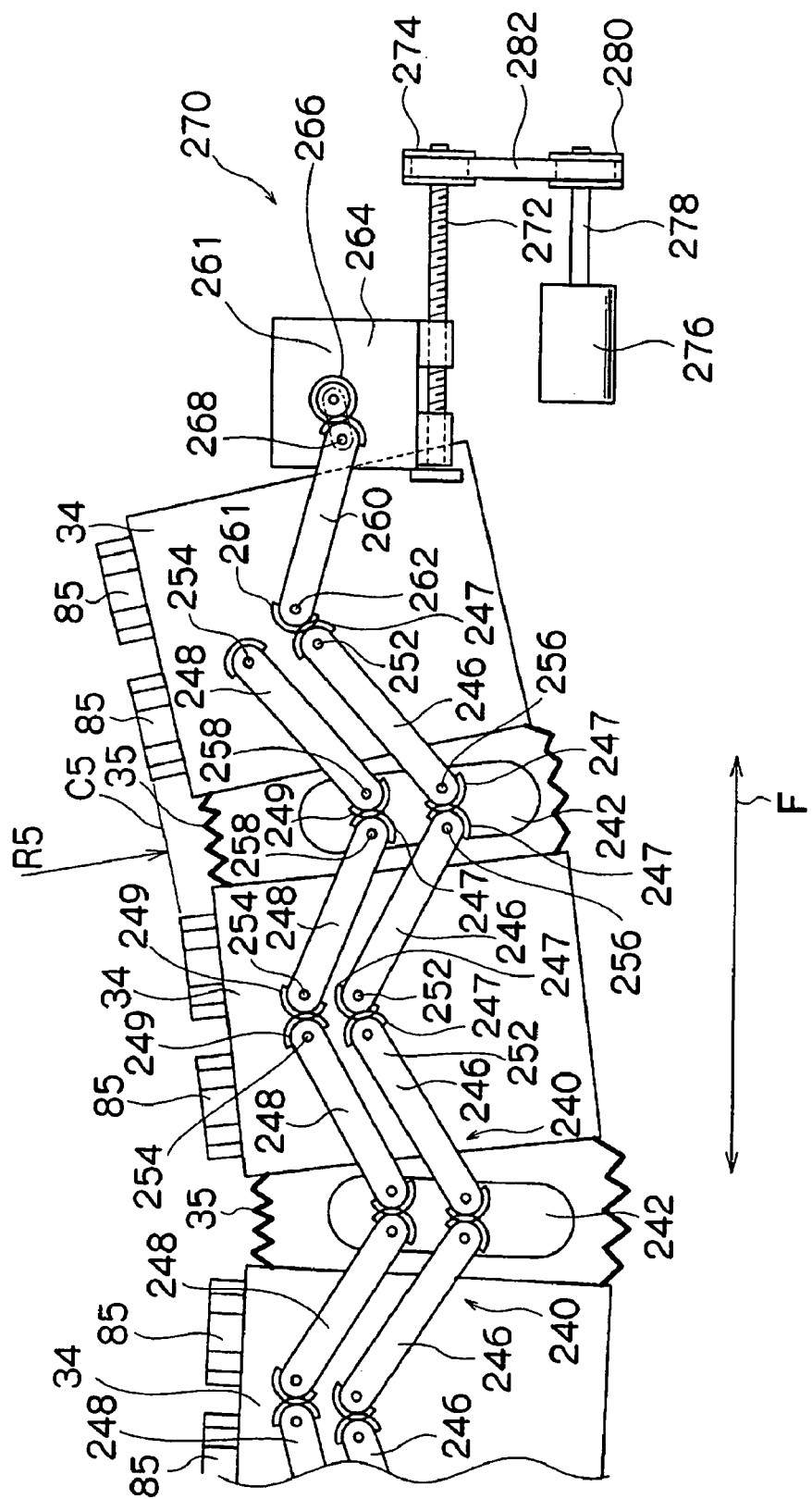
FIG. 8 is a schematic view explaining how the second linkages of the air-cooling and tempering apparatus operate.

Five lower air-blowing members 34 that are provided in the direction of the arrow F are coupled together by second linkages 240 as second four-bar linkages shown in FIG. 6 to FIG. 8. The lower air-blowing member 34 that is located on the front side in the fifth column from the left side in FIG. 4 and is coupled to a first linkage 140 is connected to a drive unit 270 shown in FIG. 7 and FIG. 8.

Each of the second linkages 240 comprises a common link 242 provided in a vertical direction and formed in an elongated shape, lower links 246 and upper links 248 obliquely provided to couple the common link 242 to the adjacent lower air-blowing members 34, and pins 252, 254, 256, 258 as pivotal members for coupling the respective links 242, 246, 248. In other words, each of the second linkages 240 is composed of the common link 242, the links 246 pivotally coupled to lower portions of the common link 242 through the pins 256 and pivotally coupled to lower portions of the adjacent lower air-blowing members 34 through the pins 252, and the links 248 pivotally coupled to upper portions of the common link 242 through the pins 258 and pivotally coupled to upper portions of the adjacent lower air-blowing members 34 through the pins 254.

Each of the links 246 has both edges formed in a circular arc shape and has the lower circular arc edge formed with a toothed portion 247. The paired links 246 that are coupled to a common link 242 are engaged with each other at the lower edges thereof and on a common plane. By this arrangement, when one of the paired links 246 is rotated by an angle θ, the other link 246 is accordingly rotated by the angle θ.

Likewise, each of the links 248 also has both edges formed in a circular arc shape and has an upper edge formed with a toothed portion 249. The upper edges of paired links 248 that are coupled to a common link 242 are engaged with each other on the common plane. By this arrangement, when one of the paired links 248 is rotated by an angle θ, the other link 248 is accordingly rotated by the angle θ. The second linkages 240 are in pairs provided to both sides of the lower air-blowing members 34 in one column provided in the direction of the arrow F as shown in FIG. 6.

In FIG. 7 and FIG. 8, a right end link 246 of the second linkage 240 provided at the right end location is geared to a left toothed portion 261 of a link 260 forming the drive unit 270. This link 260 is pivotally supported through a pin 262 by the lower air-blowing member 34 provided at the right end location, i.e., the lower air-blowing member 34 coupled to a first linkage 140 shown in FIG. 4. The link 260 shown in FIG. 7 has a right end toothed portion 261 engaged with a gear 266 fixed to a slider 264 and pivotally coupled to the slider 264 through a pin 268. By this arrangement, when the slider 264 is reciprocated in the direction of the arrow F, the link 260 is swung, using the pin 268 as the pivotal point, since the link 260 moves around the gear 266, using the pin 268 as the pivotal point.

The slider 264 is engaged with a feed screw 272 of a feed screw drive, and the feed screw is provided in the direction of the arrow F. Additionally, the slider is supported so as to be movable along an unshown guide in the direction of the arrow F. The feed screw 272 is provided with a pulley 274, which is coupled through a belt 282 to a pulley 280 provided on an output shaft 278 of an electric motor 276. By this arrangement, when the electric motor 276 is driven in normal or reverse rotation, the feed screw 272 is accordingly rotated to reciprocate the slider 264 in the direction of the arrow F.

Specifically speaking, when the slider 264, which has been located at the position shown in FIG. 7, is displaced in a left direction and arrives at the position shown in FIG. 8, the link 260 swings clockwise around the gear 266, using the pin 268 as the pivotal point, to have the angle to the horizontal line increased in the displacement process. The curved line C5 that connects the air injection nozzles of the respective projecting blocks 85 provided in the direction of the arrow F has a radius of curvature R5 decreased since the angular change in the link 260 is transmitted between adjacent second linkages 240 one after another. When the slider 264, which has been located at the position shown in FIG. 8, is displaced in a right direction and arrives at the position shown in FIG. 7, the link 260 swings counterclockwise around the gear 266, using the pin 268 as the pivotal point, to have the angle to the horizontal line decreased in the displacement process. The curved line C5 that connects the air injection nozzles of the respective projecting blocks 85 provided in the direction of the arrow F has the radius of curvature R5 increased since the angular change in the link 260 is transmitted between adjacent second linkages 240 one after another. Since the radius of curvature R5 in the direction of the arrow F can be set at a desired radius of curvature by controlling the displacement amount of the slider 264, the radius of curvature R5 can be modified according to the curved shape of the glass sheet 16.

As explained, in accordance with the lower air-blowing members 34 according to this embodiment, a plurality of lower air-blowing members 34 provided in the direction of the arrow E among all divided lower air-blowing members 34 are activated by the first linkages 140 to be displaced in such a curved fashion so as to have a first desired radius of curvature in the direction of the arrow E. A plurality of lower air-blowing members 34 provided in the direction of the arrow F among all divided lower air-blowing members 34 are activated by the second linkages 240 to be displaced in such a curved fashion so as to have a second desired radius of curvature in the direction of the arrow F.

Thus, the air-blowing surface defined by all lower air-blowing members 34 is formed as a surface having a plurality of radiuses of curvature since the air-blowing surface is composed of a combination of the first radius of curvature defined by the first linkages 140 and the second radius of curvature defined by the second linkages 240. This is also applied to the upper air-blowing members 32. Accordingly, the air-cooling and tempering apparatus 24 can deal with a complex curved glass sheet curved with a plurality of radiuses of curvature.

As explained, in accordance with the air-cooling and tempering apparatus for a glass sheet and the air-cooling and tempering method therefor of the present invention, a plurality of air-blowing members provided in a matrix pattern can be displaced in terms of positions in a row and/or column direction by linkages. By this arrangement, the positions of the air-blowing members of the upper air-blowing unit and/or the lower air-blowing unit can be modified according to the shape of a glass sheet to be cooled, making the air-blowing surface defined by all air-blowing members out of a curved surface with a first radius of curvature formed in the row direction of the matrix and a second radius of curvature formed in the column direction of the matrix combined. When the four-bar linkages have different actuation angles, it is possible to form an air-blowing surface having a plurality of radiuses of curvature. In accordance with the present invention, it is possible to deal with a curved glass sheet bent with a plurality of radiuses of curvature.

The entire disclosure of Japanese Patent Application No. 2003-124920 filed on Apr. 30, 2003 including specification, claims, drawings and summary is incorporated herein by reference in its entirety.

What is claimed is:

1. An air-cooling and tempering apparatus for a glass sheet, comprising:
    an upper air-blowing unit which blows cooling air to an upper surface of a bent glass sheet having a high temperature; and
    a lower air-blowing unit, which blows cooling air to a lower surface of the glass sheet;
    wherein each of the upper air-blowing unit and the lower air-blowing unit includes a plurality of air-blowing members provided in a matrix pattern and a plurality of linkages, wherein each of the linkages comprises a four-bar linkage, the linkages coupling adjacent air-blowing members among the plurality of air-blowing members in a row and/or column direction of the matrix pattern.

2. The apparatus according to claim 1, wherein the linkages are composed by coupling a plurality of units, each of the units comprising an elongated common link, a first link coupled to one end of the common link by a first pin and having both ends formed with toothed portions, a second link coupled to the other end of the common link by a second pin and having both ends formed with toothed portions, a third coupled to the one end of the common link by a third pin and having both ends formed with toothed portions, and a fourth link coupled to the other end of the common link by a fourth pin and having both ends formed with toothed portions.

3. The apparatus according to claim 1, wherein air-blowing members provided in the row direction on an outermost side of the matrix pattern are coupled by the four-bar linkages, and adjacent air-blowing members in the column direction of the matrix pattern among the air-blowing members are all coupled by the four-bar linkages.

4. The apparatus according to claim 1, wherein adjacent air-blowing members provided in the column direction have coupling portions sealed by a flexible boot so that cooling air communicates between the adjacent air-blowing members provided in the column direction.

5. The apparatus according to claim 1, wherein the air-blowing members of the upper air-blowing unit and the air-blowing members of the lower air-blowing unit are formed with nozzles having a aperture for injecting cooling air, respectively, and the nozzles formed on the air-blowing members of the upper air-blowing unit and the nozzles formed on the air-blowing members of the lower air-blowing unit are provided so as to confront each other.

6. The apparatus according to claim 5, wherein each of the nozzles has the aperture for injecting cooling air and a groove for letting the cooling air escape.

7. The apparatus according to claim 1, wherein the glass sheet is used for production of an automobile window.

8. An air-cooling and tempering method for a glass sheet, wherein there are provided an upper air-blowing unit which blows cooling air to an upper surface of a bent glass sheet having a high temperature; and a lower air-blowing unit which blows cooling air to a lower surface of the glass sheet; comprising:
    forming each of the upper air-blowing unit and the lower air-blowing unit out of a air-blowing members provided in a matrix pattern and a plurality of linkages, wherein each of the linkages comprises a four-bar linkage, the linkages coupling adjacent air-blowing members among the air-blowing members in a row and/or column direction of the matrix pattern;
    modifying locations of the air-blowing members forming the upper air-blowing unit and/or the lower air-blowing unit according to a shape of the bent glass sheet to be cooled;
    conveying the glass sheet subjected to heating in between the upper air-blowing unit and the lower air-blowing unit; and
    blowing the cooling air from the air-blowing members to the glass sheet to cool and temper the glass sheet.

9. An air-cooling and tempering apparatus for a glass sheet, comprising:
    an upper air-blowing unit which blows cooling air to an upper surface of a bent glass sheet having a high temperature; and
    a lower air-blowing unit, which blows cooling air to a lower surface of the glass sheet;
    wherein each of the upper air-blowing unit and the lower air-blowing unit includes a plurality of air-blowing members provided in a matrix pattern and a plurality of linkages, the linkages coupling adjacent air-blowing members among the plurality of air-blowing members in a row and column direction of the matrix pattern,
    and wherein each of the linkages comprises a first linkage forming a first radius of curvature in the row direction of the matrix and a second linkage forming a second radius of curvature in the column direction of the matrix, the air blowing surface defined by the air blowing members being a curved surface with a combined first radius of curvature and second radius of curvature.

10. The apparatus according to claim 9, wherein each of the linkages comprises a four-bar linkage.

11. The apparatus according to claim 9, wherein the linkages are composed by coupling a plurality of units, each of the units comprising an elongated common link, a first link coupled to one end of the common link by a first pin and having both ends formed with toothed portions, a second link coupled to the other end of the common link by a second pin and having both ends formed with toothed portions, a third coupled to the one end of the common link by a third pin and having both ends formed with toothed portions, and a fourth link coupled to the other end of the common link by a fourth pin and having both ends formed with toothed portions.

12. The apparatus according to claim 10, wherein air-blowing members provided in the row direction on an outermost side of the matrix pattern are coupled by the four-bar linkages, and adjacent air-blowing members in the column direction of the matrix pattern among the air-blowing members are all coupled by the four-bar linkages.

13. The apparatus according to claim 9, wherein adjacent air-blowing members provided in the column direction have coupling portions sealed by a flexible boot so that cooling air communicates between the adjacent air-blowing members provided in the column direction.

14. The apparatus according to claim 9, wherein the air-blowing members of the upper air-blowing unit and the air-blowing members of the lower air-blowing unit are formed with nozzles having a aperture for injecting cooling air, respectively, and the nozzles formed on the air-blowing members of the upper air-blowing unit and the nozzles formed on the air-blowing members of the lower air-blowing unit are provided so as to confront each other.

15. The apparatus according to claim 14, wherein each of the nozzles has the aperture for injecting cooling air and a groove for letting the cooling air escape.

16. An air-cooling and tempering method for a glass sheet, wherein there are provided an upper air-blowing unit which blows cooling air to an upper surface of a bent glass sheet having a high temperature; and a lower air-blowing unit which blows cooling air to a lower surface of the glass sheet, comprising:
    forming each of the upper air-blowing unit and the lower air-blowing unit out of a air-blowing members provided in a matrix pattern and a plurality of linkages, the linkages coupling adjacent air-blowing members among the air-blowing members in a row and column direction of the matrix pattern, wherein each of the linkages comprises a first linkage forming a first radius of curvature in the row direction of the matrix and a second linkage forming a second radius of curvature in the column direction of the matrix, the positions of the air blowing members forming the upper air blowing unit and/or the lower air blowing unit being modified according to the shape of a glass sheet to be cooled, making the air blowing surface defined by the air blowing members a curved surface with a combined first radius of curvature and second radius of curvature;
    modifying locations of the air-blowing members forming the upper air-blowing unit and/or the lower air-blowing unit according to a shape of the bent glass sheet to be cooled;
    conveying the glass sheet subjected to heating in between the upper air-blowing unit and the lower air-blowing unit; and
    blowing the cooling air from the air-blowing members to the glass sheet to cool and temper the glass sheet.

* * * * *